US012650208B2

(12) United States Patent
Baranoff

(10) Patent No.: US 12,650,208 B2
(45) Date of Patent: Jun. 9, 2026

(54) SELF-COILING LIGHT STRUCTURE

(71) Applicant: Sergei Constantine Baranoff, West Sacramento, CA (US)

(72) Inventor: Sergei Constantine Baranoff, West Sacramento, CA (US)

( * ) Notice: Subject to any disclaimer, the term of this patent is extended or adjusted under 35 U.S.C. 154(b) by 1 day.

(21) Appl. No.: 19/056,733

(22) Filed: Feb. 19, 2025

(65) Prior Publication Data

US 2025/0271111 A1 Aug. 28, 2025

Related U.S. Application Data

(60) Provisional application No. 63/556,953, filed on Feb. 23, 2024.

(51) Int. Cl.

| | |
|---|---|
| ***F21S 4/26*** | (2016.01) |
| ***F21V 15/01*** | (2006.01) |
| ***F21V 23/06*** | (2006.01) |
| ***F21V 31/00*** | (2006.01) |
| ***H01B 7/06*** | (2006.01) |
| *F21Y 103/10* | (2016.01) |
| *F21Y 115/10* | (2016.01) |

(52) U.S. Cl.

CPC .............. *F21S 4/26* (2016.01); *F21V 15/012* (2013.01); *F21V 23/06* (2013.01); *F21V 31/00* (2013.01); *H01B 7/065* (2013.01); *F21Y 2103/10* (2016.08); *F21Y 2115/10* (2016.08)

(58) Field of Classification Search

CPC .. F21Y 2115/10; F21Y 2103/10; F21V 31/00; F21V 23/06; F21V 15/02; F21S 4/26; H01B 7/06; H01B 7/065

See application file for complete search history.

(56) References Cited

U.S. PATENT DOCUMENTS

2006/0158878 A1 7/2006 Howell
2007/0183147 A1* 8/2007 Herlands .............. B65H 75/364 362/225
2016/0116239 A1 4/2016 Nakayama et al.

FOREIGN PATENT DOCUMENTS

CN 108364718 A * 8/2018 ............. H01B 7/065
GB 2634050 A * 4/2025 ......... B60R 16/0215
WO WO 2009/029118 A1 3/2009

OTHER PUBLICATIONS

Innovation Q+ NPL Search (Year: 2024).*

(Continued)

*Primary Examiner* — Anabel Ton

(74) *Attorney, Agent, or Firm* — Fenwick & West LLP

(57) ABSTRACT

A self-coiling light structure is designed to expand and retract in a controlled manner to prevent tangling and facilitate compact storage. The structure comprises a flexible coil made of wire, rope, plastic, or a combination thereof, incorporating a power-conducting element and LED lights positioned at intervals. The coil is configured to retain a predetermined shape through an internal memory material, allowing it to automatically retract into a compact form when not in use. The structure further includes securement features such as loops or clips for attachment to external structures, as well as male and female power connectors for interconnection with additional sections. Various embodiments provide for different configurations of the coil in excited and unexcited states, ensuring ease of deployment and retraction.

9 Claims, 7 Drawing Sheets

(56) References Cited

OTHER PUBLICATIONS https://www.homedepot.com/p/Lukyamzn-Adhesive-Cable-Clips-Assorted-Sizes-Cord-Organizer-Wire-Holder-White-100-Piece-for-Cable-Management-and-Outdoor-Use-PH03327B051/336729357 (Year: 2024).*

International Search Report and Written Opinion, PCT Application No. PCT/US2025/016522 Apr. 23, 2025, eight pages.

* cited by examiner

1a

SELF-COILING LIGHT STRUCTURE

CROSS REFERENCE TO RELATED APPLICATIONS

This application claims the benefit of U.S. Provisional Application No. 63/556,953, filed Feb. 23, 2024, which is incorporated by reference in its entirety.

BACKGROUND

Holiday and decorative lights are a standard item used to enhance both the exterior and interior of structures during celebratory events. Various embodiments of lights exist including string lights, icicle lights and the like both battery and plug in powered. But a long standing problem exists with all these forms. In particular, the wires used to power and affix the lights to are strands and thus can easily become tangled, knotted, and broken through use.

SUMMARY

To address the problem of tangled, knotted, and difficult-to-store decorative lighting, one or more embodiments provide an effective system that expands and retracts in a coil-like manner to eliminate tangling and improve storability when not in use. The self-coiling light structure is designed to automatically return to a compact, coiled state while remaining easily extendable for deployment.

In one embodiment, the self-coiling light structure includes an elongate body configured to transition between a coiled state and an expanded state. The elongate body comprises a power-conducting element running along its length, a plurality of LED lights positioned at intervals, a shape-memory material that biases the elongate body toward the coiled state, and an outer shell encasing at least a portion of the structure. The system further includes first and second connectors at opposing ends, allowing the light structure to be coupled to a power source or interconnected with additional light structures. At least one securement feature is provided to enable attachment to an external structure.

Additional features may be included to enhance durability, functionality, and usability. In some embodiments, the shape-memory material comprises a wire, polymer, or composite configured to retain the coiled shape when not under tension. The outer shell may be constructed from a flexible, protective material resistant to weather and mechanical stress, and the LED lights may be embedded within the shell for added protection. Securement features may include looped material along the elongate body or clips positioned at the ends for easy attachment. The first and second connectors may be configured as male and female power connectors, enabling multiple units to be electrically linked in series. In certain embodiments, the elongate body is designed to maintain a predetermined spacing between adjacent LED lights when extended. Additionally, an internal structural support may be included to prevent over-compression when coiled. Some embodiments further allow the shape-memory material to be selectively activated by an external stimulus to transition between states.

These and other embodiments provide an improved lighting system that mitigates the common problems associated with traditional string lights, offering enhanced ease of use, durability, and storage efficiency.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In various embodiments described herein, a self-coiling light structure is designed for ease of deployment and storage, providing a solution to the common problem of tangled decorative lights. By enabling automatic retraction and compact storage, this system reduces setup time and enhances usability and can be used for a wide range of lighting applications.

Figure 1:
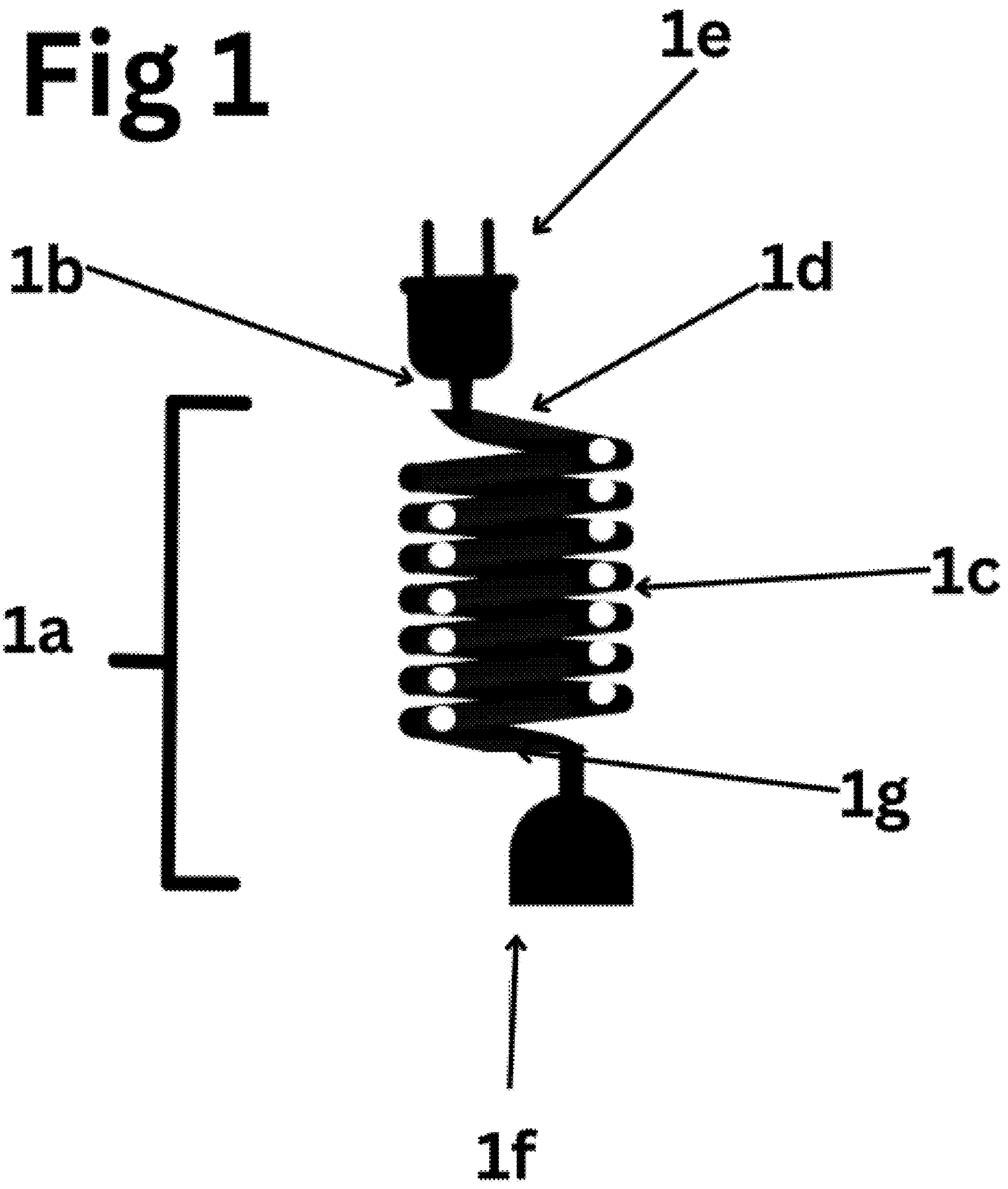
FIG. 1 is a side view of the self-coiling light structure, in accordance with an embodiment of the invention.

FIG. 1 illustrates a side view of the self-coiling light structure in accordance with an embodiment of the invention. As shown, coil 1*a* consists of a flexible elongate body, which may comprise wire, rope, plastic, or a combination of these materials. The elongate body is configured to transition between a coiled and expanded state, allowing for compact storage and efficient deployment. A power-conducting element 1*b* extends along the length of the elongate body, supplying electrical power to a plurality of LED lights 1*c* that are positioned at standard intervals. A male power end 1*e* and a female power end 1*f* enable electrical coupling to a power source or interconnection with additional light structures. A protective outer shell 1*g* encases at least a portion of the elongate body, enhancing durability and resistance to environmental factors such as moisture, temperature fluctuations, and mechanical stress. In some embodiments, the outer shell is designed for outdoor use, offering protection against UV exposure, rain, and extreme temperatures.

Figure 2:
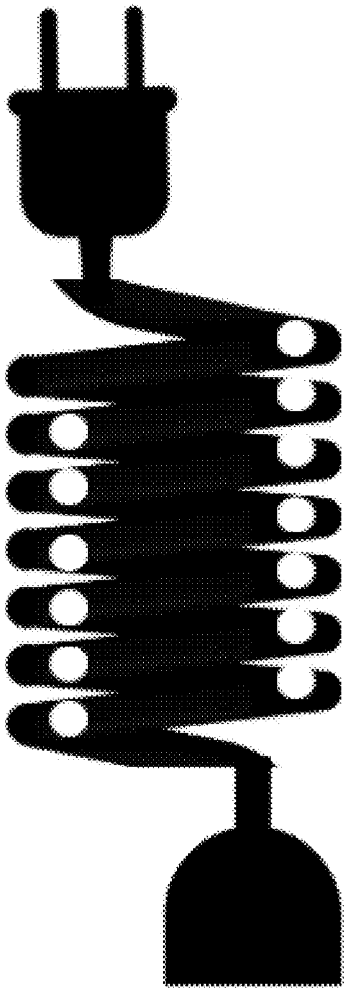
FIGS. 2 and 3 illustrate the self-coiling light structure of FIG. 1, in retracted and extended states, respectively.
Figure 3:
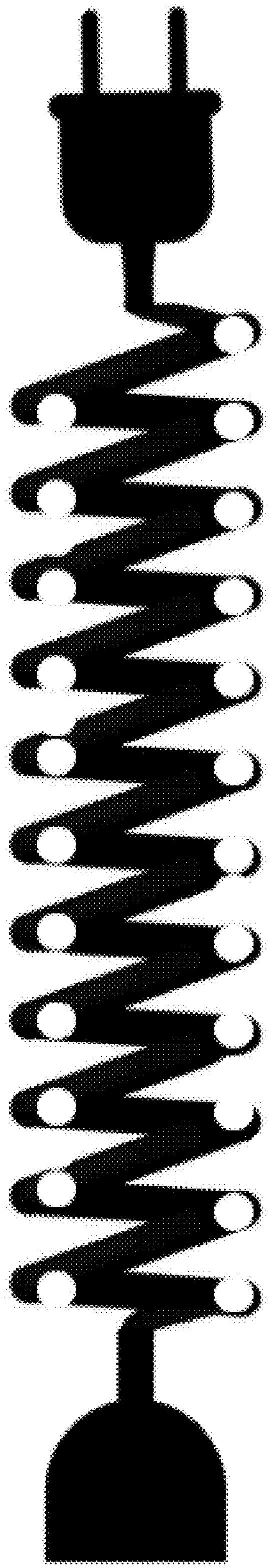

FIGS. 2 and 3 illustrate the self-coiling light structure in its retracted and extended states, respectively. FIG. 2 depicts coil 1*a* in a retracted state, where the shape-memory material within the elongate body biases the structure toward the coiled (or retracted) configuration. FIG. 3 shows the structure in its extended position, where an external force has caused the elongate body to stretch to its full length. Upon the removal of this external force, the structure automatically returns to its coiled state, preventing the structure from tangling and facilitating storage of the structure.

Figure 4:
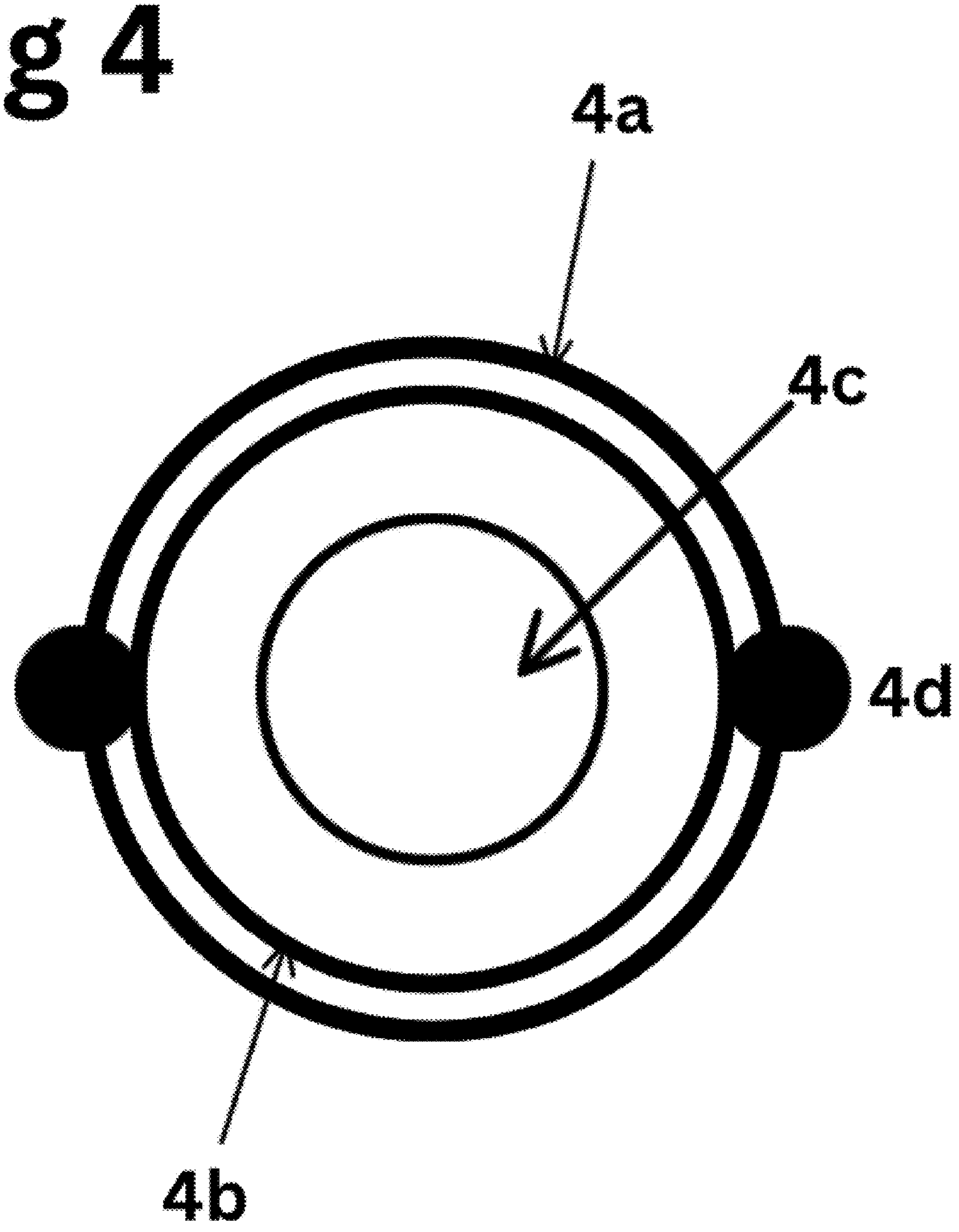
FIG. 4 is an axial view of a self-coiling light structure, in accordance with an embodiment of the invention.

FIG. 4 is an axial view illustrating the internal components of the self-coiling light structure. The structure includes an outer shell 4*a*, which serves to protect internal components from environmental and mechanical damage. A power-conducting material 4*b* extends along the length of the structure, ensuring continuous power supply to LED lights 4*d*, which are positioned at regular intervals. A shape-memory material 4*c* is embedded within the structure, functioning to bias the elongate body toward the coiled state. In one embodiment, the shape-memory material comprises wire, polymer, or a composite material that retains its coiled shape when not under tension.

Figure 5:
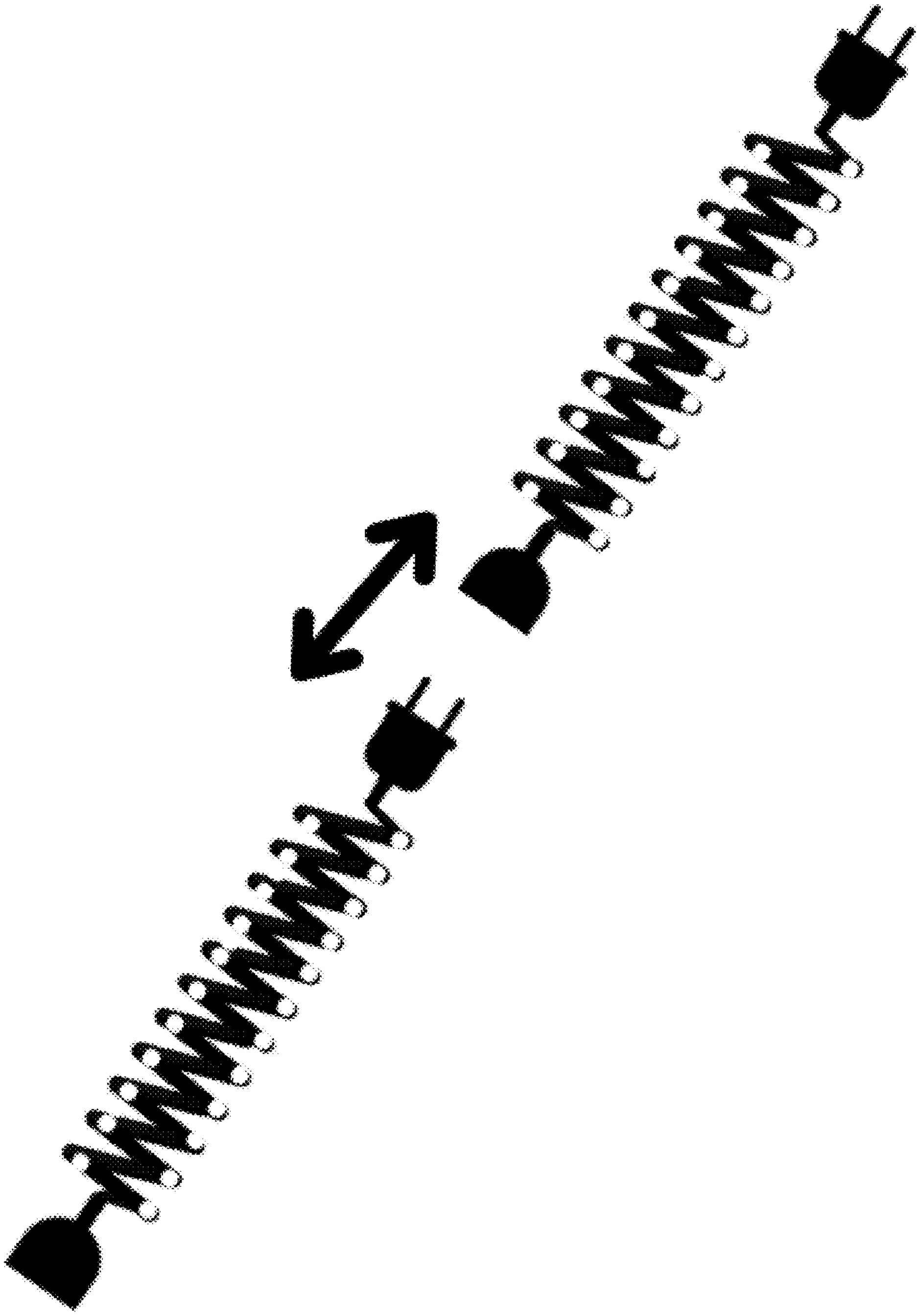
FIG. 5 illustrates the coupling of a pair of the self-coiling light structures, in accordance with an embodiment of the invention.

FIG. 5 illustrates the coupling of multiple self-coiling light structures, where each self-coiling light structure may be consistent with the embodiment shown in FIG. 1. This configuration extends the illuminated area while maintaining a streamlined power supply, reducing the need for additional power sources. Additionally, coupling multiple structures enhances flexibility, allowing users to customize lighting arrangements for different spaces and applications.

Figure 6:
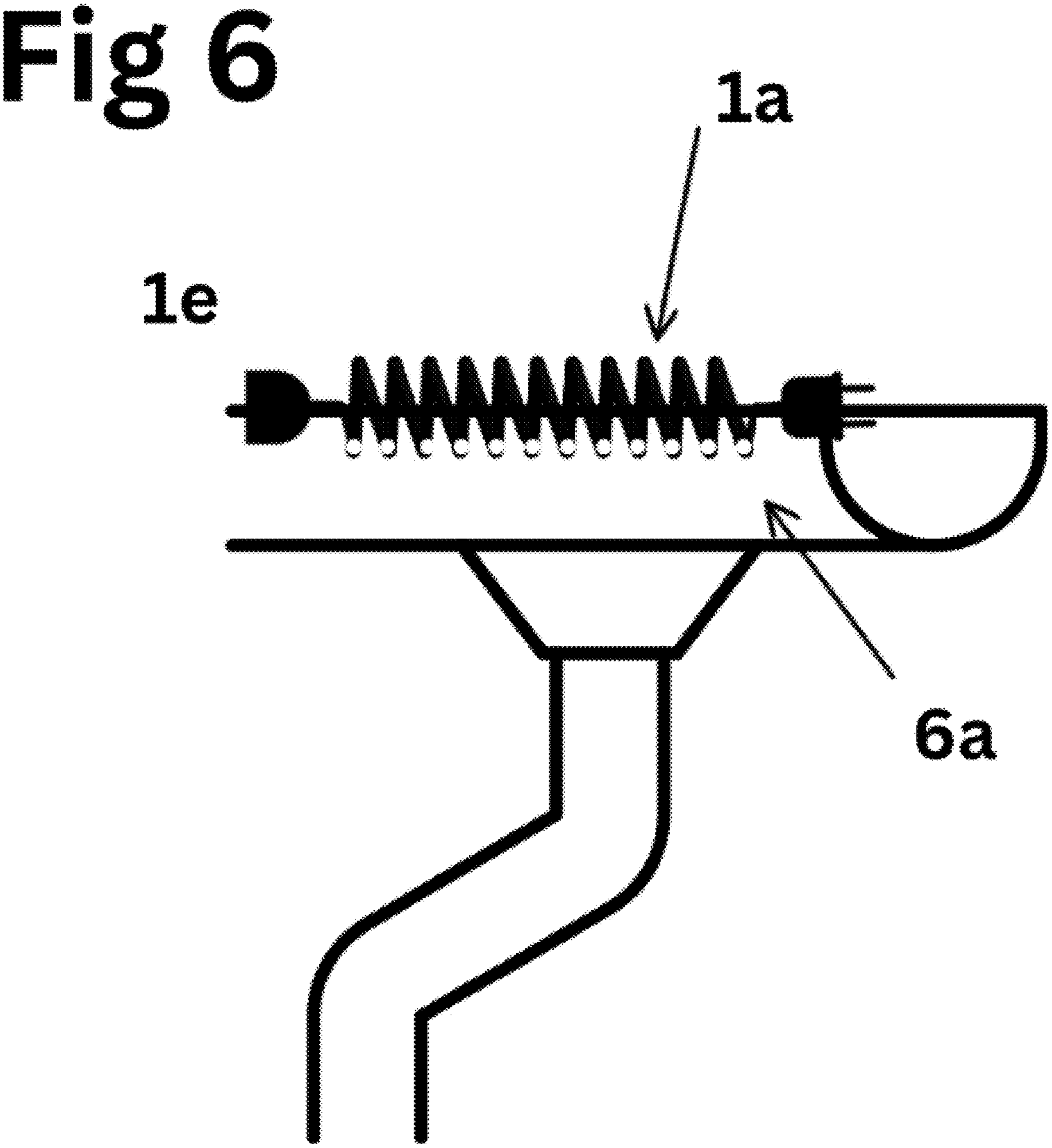
FIG. 6 illustrates the self-coiling light structure of FIG. 1, in a mounted state.

FIG. 6 depicts the self-coiling light structure in a mounted state, attached to an external structure 6*a*. In one embodiment, the shape-memory property of the structure enables it to conform to various mounting configurations while maintaining its ability to retract when removed.

Figure 7:
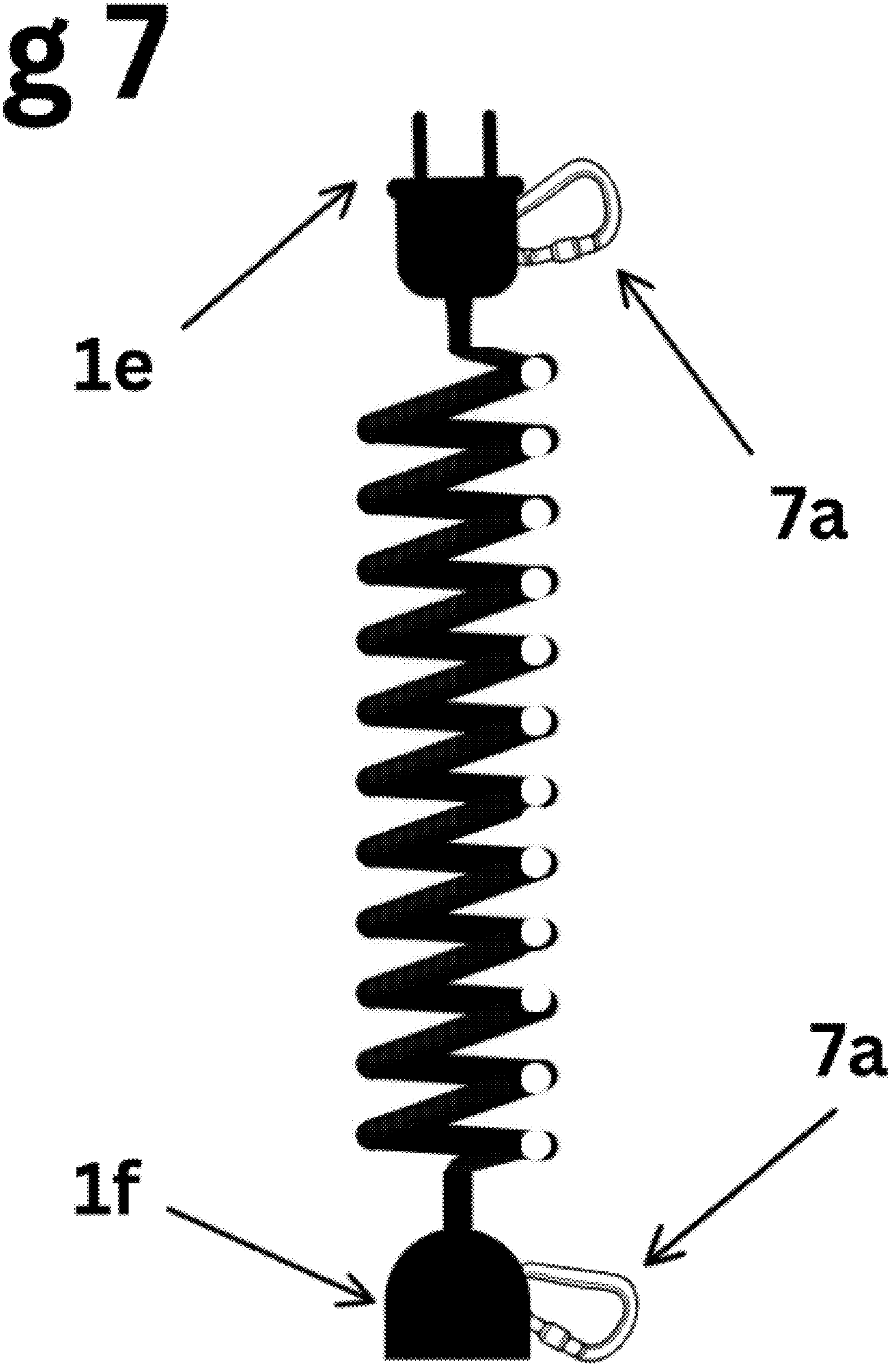
FIG. 7 illustrates the self-coiling light structure of FIG. 1, with attachment mechanisms for mounting the self-coiling light structure.

FIG. 7 illustrates the self-coiling light structure with attachment mechanisms 7*a* designed for mounting. In one embodiment, the attachment mechanisms 7*a* comprise clips that may be integrated into the male power end 1*e* and/or the female power end 1*f*. These clips provide additional securement options, allowing for quick and stable attachment to external structures. In some embodiments, the clips are adjustable to accommodate different attachment points. In other embodiments, they are specifically designed for particular structure types such as poles, railings, or flat surfaces. In some embodiments, the clips are designed for temporary attachment, facilitating easy repositioning. The design of the clips ensures easy detachment and reusability, enhancing the versatility of the self-coiling light structure.

Through the use of shape-memory materials, securement features, and flexible power connectivity, embodiments of the self-coiling light structure enhance both usability and durability in various applications. The combination of automatic retraction, adaptability to different mounting structures, and scalable connectivity ensures that the system remains user-friendly, efficient, and versatile across a broad range of use cases.

Accordingly, embodiments of the self-coiling light structure presents an improved solution for decorative lighting by offering a tangle-free, easy-to-store, and scalable system. In addition to decorative applications, this system can be used for temporary event lighting, emergency illumination, or adaptable outdoor installations requiring flexible and easily stored lighting solutions. The scalability of this structure makes it suitable for a variety of applications, from small residential setups to large-scale commercial or event installations where extended lighting coverage is required. For example, the structure could be deployed in residential settings, in large outdoor festivals where temporary yet durable lighting is essential, in commercial storefront displays that require flexible illumination solutions for seasonal decorations, or on construction sites where portable and reliable lighting is needed for safety and visibility.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Specifically, other variations may be included in providing a method of connecting the inflatable body to the base as well as arrangements of the drive units.

Moreover, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A self-coiling light structure comprising:

an elongate body configured to transition between a coiled state and an expanded state, the elongate body including:
  - a power-conducting element extending along its length,
  - a plurality of LED lights positioned at intervals along the elongate body,
  - a shape-memory material configured to bias the elongate body toward the coiled state, and
  - an outer shell encasing at least a portion of the elongate body, wherein the outer shell forms a continuous, sealed sheath encapsulating the LED lights entirely within the shell to provide additional protection;

a first connector at a first end and a second connector at a second end, the first and second connectors configured to electrically couple to a power source or additional light structures; and at least one securement feature configured to attach the elongate body to an external structure.

2. The self-coiling light structure of claim 1, wherein the shape-memory material comprises a wire, polymer, or composite material configured to return the elongate body to the coiled state when not under tension.

3. The self-coiling light structure of claim 1, wherein the outer shell is formed from a flexible, protective material resistant to weather and mechanical stress.

4. The self-coiling light structure of claim 1, wherein the securement feature comprises a looped material integrated along the elongate body for attachment to an external structure.

5. The self-coiling light structure of claim 4, wherein the securement feature further comprises clips positioned at the first and second ends to facilitate attachment.

6. The self-coiling light structure of claim 1, wherein the first and second connectors are configured as male and female power connectors, enabling multiple self-coiling light structures to be electrically linked in series.

7. The self-coiling light structure of claim 1, wherein the elongate body is configured to maintain a predetermined spacing between adjacent LED lights when in the expanded state.

8. The self-coiling light structure of claim 1, further comprising an internal structural support that prevents over-compression of the elongate body when in the coiled state.

9. The self-coiling light structure of claim 1, wherein the shape-memory material is selectively activatable to transition between the coiled state and the expanded state in response to an external stimulus.

* * * * *